United States Patent [19]

Lee

[11] Patent Number: 4,893,810

[45] Date of Patent: Jan. 16, 1990

[54] QUICK RELEASE COLLAR

[76] Inventor: Scott H. Lee, R.R. 2, Box 10, Church St., Putnam, Conn. 06260

[21] Appl. No.: 282,876

[22] Filed: Dec. 9, 1988

Related U.S. Application Data

[63] Continuation of Ser. No. 163,131, Feb. 23, 1988, abandoned, which is a continuation of Ser. No. 888,516, Jul. 21, 1986, abandoned.

[51] Int. Cl.$^4$ .............................................. A63B 13/00
[52] U.S. Cl. .................... 272/123; 24/115 L; 24/136 A; 285/316; 403/328
[58] Field of Search .................. 272/117, 122, 123; 24/115 L, 136 R, 136 A, 803, 585, 594, 596; 285/304, 316; 403/261, 322, 325, 328

[56] References Cited

U.S. PATENT DOCUMENTS

| | | | |
|---|---|---|---|
| 700,412 | 5/1902 | Fischer | 24/136 A |
| 1,829,760 | 11/1931 | Santiago | 24/136 A |
| 2,062,628 | 12/1936 | Yannetta | 24/136 A |
| 2,429,202 | 10/1947 | Estill et al. | 285/316 X |
| 2,473,622 | 6/1949 | Truswell | 24/115 L X |
| 2,514,760 | 7/1950 | Hanson et al. | 24/136 A |
| 3,335,469 | 8/1967 | Shand et al. | 24/115 L |
| 3,726,522 | 4/1973 | Silberman | 272/123 |
| 4,141,117 | 2/1979 | Van Gompel | 24/136 R |
| 4,392,555 | 7/1983 | Ellis | 24/115 L X |
| 4,579,337 | 4/1986 | Uyeda | 272/123 |
| 4,641,637 | 2/1987 | Rosen | 128/75 |
| 4,647,081 | 3/1987 | Landgraf et al. | 285/304 |

FOREIGN PATENT DOCUMENTS

| | | | |
|---|---|---|---|
| 196185 | 2/1958 | Austria | 24/115 L |
| 629735 | 2/1927 | France | 272/123 |

Primary Examiner—Richard J. Apley
Assistant Examiner—Robert W. Bahr
Attorney, Agent, or Firm—Samuels, Gauthier, Stevens & Kehoe

[57] ABSTRACT

A quick release collar for a weight lifting barbell includes a collar body, an axially movable sleeve and a plurality of radially movable balls which are cammed into frictional engagement with the bar. A tension ring rigidly attached to the sleeve has a tapered inner surface portion which controls the radial positions of the movable balls. A coil spring biases the sleeve and tension ring toward a locked position in which the movable balls securely engage the bar. The collar is easily unlocked with one hand so that it can be slipped off the bar.

18 Claims, 1 Drawing Sheet

QUICK RELEASE COLLAR

This is a continuation of co-pending application Ser. No. 163,131 filed on 2/23/88 now abandoned, which in turn is a continuation of now abandoned Ser. No. 888,516 filed on 7/21/86.

FIELD OF THE INVENTION

This invention relates to a quick release collar for a bar and, more particularly, to a quick release collar which is intended for, but not limited to, retaining weight plates on a weight lifting barbell.

BACKGROUND OF THE INVENTION

The weights used by bodybuilders and weight lifters typically include a bar or shaft of several feet in length with a rotatable, knurled sleeve slipped over the central portion of the bar and with fixed stops at the opposite ends of the sleeve. Disc-like weight plates with central openings are loaded onto opposite ends of the bar and are secured in position against the stops by a pair of collars. Various sizes and numbers of weight plates are used to obtain a desired total weight. The plates are changed frequently because different weights are required during a succession of lifts or for different exercises or for different individuals.

Because the weight plates are changed frequently during use, the collars which hold them in position on the bar must be easily put on and taken off, preferably without the use of any tools. On the other hand, the collars must hold the weight plates securely in position because accidental slipping or dropping of the weight plates can result in personal injury and property damage.

The most commonly used collar for weight lifting includes a bushing with a bolt or screw which passes through a threaded hole and frictionally bears against the bar. The collar is secured in place by tightening the bolt against the bar. The bolt can be tightened with a tool or may have an L-shaped extension for manual tightening. Collars of this type have a number of disadvantages. The bolts frequently loosen, allowing the weight plates to slip on the bar or to fall off the bar. The bolts are difficult and inconvenient to tighten in a secure manner. In addition, when the bolts are fully tightened, they often dig into and damage the bar. Other prior art collars include a two-piece bushing with bolts on opposite sides of the bar, similar to a pipe clamp. These collars don't damage the bar. However, the inconvenience of tightening bolts remains. With collars using the friction of a manually-tightened bolt, the clamping force depends on the extent to which the bolt is tightened and may be insufficient.

British patent application Ser. No. 2,151,493A by Marcy Gymnasium Equipment Co., published July 24, 1985, discloses a weight clamping arrangement for a barbell wherein locking ball members are engaged in grooves in the bar. Quick release mechanisms are also disclosed in U.S. Pat. Nos. 4,395,051 to Tanamura and 4,453,449 to Holman.

Quick release collars have been described above in connection with weight lifting barbells. However, quick release collars have a wide variety of applications where quick release and secure holding with a moderate amount of force are required. Examples of such applications are in tire changers used in service stations, spare tire retention devices for automobiles, retention of wheels on toys, wagons and the like, and for adjustable telescoping devices such as projection screens, drafting tables and beach umbrellas.

It is a general object of the present invention to provide a novel quick release collar for use on a bar or shaft.

It is a further object of the present invention to provide a quick release collar which is easily and manually removable without tools and without turning the collar on the bar.

It is a further object of the present invention to provide a quick release collar which stays securely in position on a bar without damaging the bar.

SUMMARY OF THE INVENTION

According to the present invention, these and other objects and advantages are achieved in a quick release collar for mounting on a bar. The collar comprises a collar body including a cylindrical shell with an axial passage for the bar, grip means on the outer surface of the shell, a first flange axially spaced from the grip means on the outer surface of the shell and a plurality of radial openings in the shell. A radially movable ball is located in each of the openings in the shell. The quick release collar further includes a collar sleeve positioned outside and coaxial with the collar body which defines a space between the collar sleeve and the collar body. The sleeve includes a second flange extending radially inward to the collar body between the grip means and the first flange. A tension ring is rigidly attached to the collar sleeve in the space between the sleeve and the collar body, and a spring is positioned between the first flange and the second flange. The sleeve and the tension ring are axially slidable with respect to the collar body between a locked position and an unlocked position. The tension ring has a tapered inner surface portion adjacent to the movable balls. The inner surface portion is tapered to provide a relatively small diameter adjacent to the movable balls in the locked position and a relatively large diameter adjacent to the movable balls in the unlocked position, such that the radial postions of the movable balls depend on the axial position of the tension ring. The spring biases the sleeve and the tension ring axially toward the locked position so that the tension ring cams the movable balls inwardly into frictional engagement with the bar. The grip means and the collar sleeve are manually spreadable to compress the spring and to move the tension ring axially toward the unlocked position so that the balls move outwardly.

BRIEF DESCRIPTION OF THE DRAWINGS

For a better understanding of the present invention, together with other and further objects, advantages and capabilities thereof, reference may be had to the accompanying drawings which are incorporated herein by reference and in which.

DETAILED DESCRIPTION OF THE INVENTION

Figure 1:
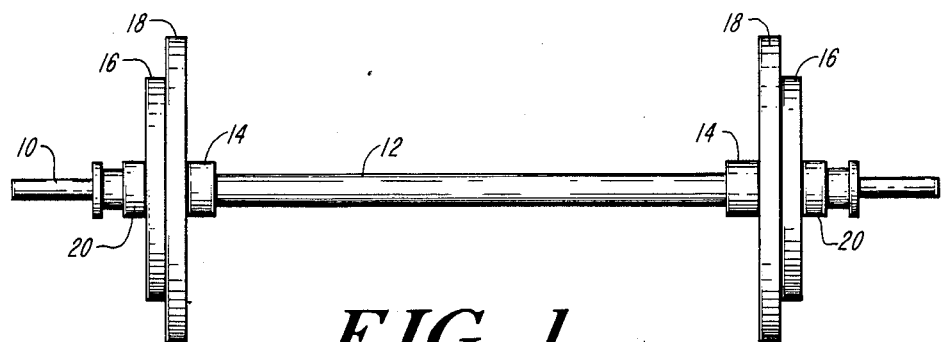
FIG. 1 illustrates the components of a barbell using the quick release collar of the present invention.

A weight lifting barbell with a quick release collar according to the present invention is shown in FIG. 1. A solid bar 10 of circular cross-section and of a metal such as steel, passes through a knurled sleeve 12 which rotates freely about the bar 10. The knurled sleeve 12 is fixed against lateral displacement in the center of bar 10 by stops 14 which can be bushings permanently attached to the bar 10 by any convenient means. Disc-shaped weight plates 16 and 18 each have a central hole for passage of the bar 10. Weight plates 16 and 18 of equal weight are slipped onto opposite ends of the bar 10 into abutment with the fixed stops. Then, a quick release collar 20, in accordance with the present invention, is installed on each end of the bar 10 in close-fitting abutment with each weight plate 16. The weight plates 16 and 18 are securely held in position during use by the collars 20. When it is desired to change or remove the weight plates 16 and 18, each quick release collar 20 is manually grasped and unlocked as described below and is slipped off bar 10 with one hand.

Figure 2:
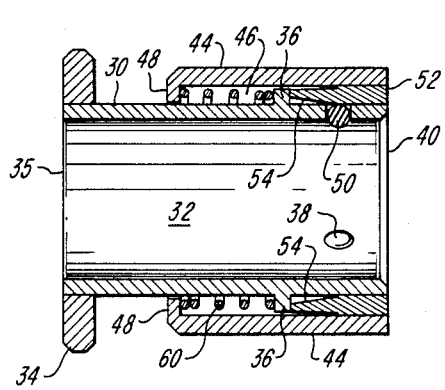
FIG. 2 is a cross-sectional view of the quick release collar of the present invention in the locked position.
Figure 3:
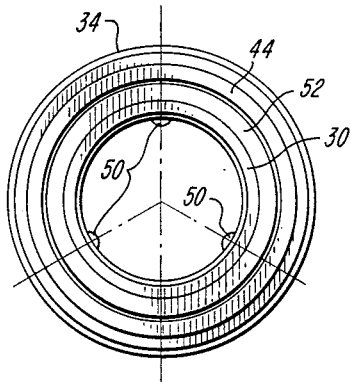
FIG. 3 is an end view of the quick release collar of the present invention in the locked position.

The quick release collar 20 of the present invention is shown in the locked position in FIG. 2. A collar body 30 includes a generally cylindrical shell with a central opening 32 sized to permit passage of the bar 10. An annular grip ring 34 is provided at a first (or outboard) end 35 of the collar body 30 to facilitate manual release of the collar. Axially spaced from the grip ring 34 along the collar body 30 is an outwardly extending circumferential flange 36 around the outside periphery of the cylindrical shell. The collar body 30 is also provided with three (this number could vary) radial openings 38 which pass through the cylindrical shell between the flange 36 and a second (or inboard) end 40 of the collar body 30. In use, the inboard end 40 of the collar body 30 faces toward and abuts against the weight plates 16.

A collar sleeve 44 coaxial with and outside the collar body 30 defines a space 46 between the collar sleeve 44 and the collar body 30. The collar sleeve 44 includes an annular flange 48 extending inwardly to the collar body 30 between the grip ring 34 and the collar body flange 36.

Positioned in each of the radial openings 38 in collar body 30 is a spherical metal ball 50. The radial openings 38 are tapered or otherwise shaped to permit each of the balls 50 to move radially within and to extend partially beyond the openings 38 but not to escape completely from the openings 38.

Figure 4:
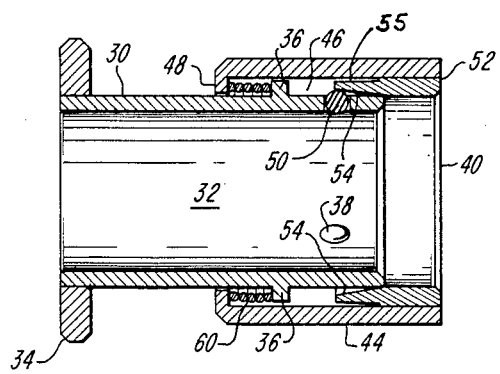
FIG. 4 is a cross-sectional view of the quick release collar of the present invention in the unlocked position.

A tension ring 52 is immovably fixed to the collar sleeve 44 in the space 46 between the collar sleeve 44 and the collar body 30 adjacent to the inboard end 40 of the collar sleeve 44. The tension ring 52 has a generally cylindrical shape and is typically pressed into the collar sleeve 44 so as to be firmly retained therein. The collar sleeve 44 and the tension ring 52 are axially slidable as a unit with respect to the collar body 30 between the locked position shown in FIG. 2 and the unlocked position shown in FIG. 4. The tension ring 52 includes a tapered or inclined inner surface portion 54 adjacent to the movable balls 50 for controlling the radial outward movement of the balls 50. The surface portion 54 is tapered to provide a relatively small diameter adjacent to the movable balls 50 when the quick release collar 20 normally assumes its locked position, and a relatively large diameter adjacent to the movable balls 50 when the quick release collar is manually caused to assume its unlocked position. Preferably, the surface portion 54 has a truncated conical shape. When the quick release collar 20 is permitted to assume its normal position as shown in FIG. 2, the smaller end of the inner surface portion 54 cams the movable balls 50 radially inward through the openings 38 into contact with the bar 10. A space 55 extends along the axial length of the tapered surface portion 54 between the external surface of the ring 52 and the internal surface of the sleeve 44. The tapered surface portion is thus radially unsupported and capable, in response to the camming forces exerted on the balls 50, of undergoing radial flexure in relation to both the collar body 30 and the sleeve 44. These camming forces develop hoop stresses in the ring itself as the ring is sprung outwardly, hence the term "tension ring". When the collar 20 is manually caused to assume its unlocked position as shown in FIG. 4, the balls 50 can move radially outward in openings 38 away from the bar 10. The tapered surface portion 54 accommodates some variations in bar diameter because of the spring-biased camming action on the balls 50 which causes the balls 50 to move radially inward until they engage the bar or until the fully locked position is reached.

The quick release collar 20 is further provided with a coil spring 60 coaxial with the collar body 30 and positioned in the space 46 between the collar body flange 36 and the sleeve flange 48. The spring 60 axially biases the collar sleeve 44 and the tension ring 52 in one direction and axially biases the collar body 30 in the opposite direction. The spring 60 biases the quick release collar towards its locked position in which the tension ring 52 cams the movable balls 50 inwardly through the openings 38 into secure frictional engagement with the bar 10 whereby collar 20 firmly grips the bar 10. In the fully locked position, the outboard end of the tension ring 52 bears against the collar body flange 36, preventing further axial movement of the tension ring 52. However, the diameter of the bar 10 may be so large as to prevent the collar 20 from reaching its fully locked position without any adverse effects on collar operation.

When the quick release collar 20 of the present invention is to be put on the bar 10, collar sleeve 44 is grasped with one hand, and the inboard end 40 of the collar 20 is slipped onto the end of the bar 10. Because the collar 20 is normally in its locked position (shown in FIG. 2), the inwardly protruding balls 50 strike the end of the bar 10. Then, as sleeve 44 is manually moved in the inboard direction, the collar slightly unlocks causing the balls 50 to be pushed radially outward in the openings 38. Collar 20 can then be snugged up against the weight plates by being manually pushed in the inboard direction. The manual one-handed force can be applied to the sleeve 44 or to the grip ring 34. The collar moves easily and smoothly in the inboard direction because balls 50 roll in a direction causing a slight unlocking action of the collar 20. In contrast, any outward force by the weight plate 16 or by manual pressure against the inboard end 40 of the collar sleeve 44 and the tension ring 52 causes the tension ring 52 to cam the balls 50 radially inward into tighter frictional engagement with the bar 10. The tapered inner surface portion 54 provides a force on the balls 50 having both axial and a radial components. The radial component increases the grip of the balls 50 on the bar 10, thereby preventing outward slipping of the collar 20 on the bar 10.

When it is desired to unlock or release the collar of the present invention, it is necessary only to grasp the collar 20 and spread the grip ring 34 and the collar sleeve 44 apart in opposite directions with the thumb and one or two fingers. A small amount of spreading pressure releases the balls 50 from gripping contact with the bar 10. Then, so long as the spreading pressure is maintained, the collar 20 can be slipped off the end of the bar 10 for changing the weight plates. Unless the bar has a very large diameter, it is not necessary to compress the spring 60 all the way to the fully unlocked position as shown in FIG. 4 in order to release the frictional engagement between the bar 10 and the balls 50. A relatively small axial displacement between the collar body 30 and the collar sleeve 44 is usually sufficient. To make the manual operation of the collar more comfortable, it is desirable to remove sharp edges from the grip ring 34 and the collar sleeve 44 by beveling or rounding.

The grip ring 34 has been disclosed above as an annular ring at the end of the collar body 30. Typically, the grip ring 34 is pressed onto the collar body 30. However, it will be understood that any suitable means for gripping the collar body 30 is included within the scope of the present invention. For example, the collar body 30 may be provided with raised ridges to provide a grip. Furthermore, the grip means is not necessarily located at the outboard end of the collar body 30.

The elements of the collar are typically fabricated from a metal such as steel. However, it will be understood that the collar can be fabricated from plastic or other suitable materials without departing from the scope of the present invention.

The quick release collar of the present invention is easily and manually removable without tools and without having to be rotated around the bar. In addition, the collar of the present invention is compatible with any bar or shaft of circular cross-section and does not require grooves or other modifications on the bar or shaft.

While there has been shown and described what is at present considered the preferred embodiment of the present invention, it will be understood by those skilled in the art that various changes and modifications may be made therein without departing from the scope of the invention as defined by the appended claims.

What is claimed is:

1. A quick release collar adapted to be axially received on and to be removably fixed at any selected location along the length of an elongated element, comprising:
   a collar body having an axially extending passage extending therethrough for receiving said element, a radially outwardly extending first flange on the outer surface of said collar body, and a plurality of radial openings in said collar body;
   radially movable balls located within the openings in said collar body;
   a sleeve surrounding said collar body and defining a space therebetween, said sleeve including a second flange extending radially inwardly toward said collar body at a location spaced axially from said first flange;
   a tension ring integrally associated with and surrounded by said sleeve, said tension ring being located in the space between said sleeve and said collar body, said sleeve and said tension ring being axially slidable as a unit with respect to said collar body between a locked position and an unlocked position, said tension ring having an end portion with a tapered inner surface, said tapered inner surface having a relatively small dimensioned segment which urges said movable balls radially inwardly into said passage in the locked position, and having a relatively large dimensioned segment accommodating radial movement of said movable balls out of said passage in the unlocked position; means for accomodating radial flexure of substantially the entire length of said end portion in relation to both said collar body and said sleeve; and, biasing means positioned in said space between said first and second flanges for normally biasing said sleeve and said tension ring axially with respect to said collar body toward the locked position, said tension ring and said first flange being coactively engageable to limit the extent of movement of said sleeve and said tension ring toward the locked position.

2. A quick release collar as defined in claim 1 further comprising grip means on the outer surface of said collar body, said grip means and said second flange being axially separable to compress said biasing means while moving said tension ring axially toward the unlocked position.

3. The quick release collar as defined in claim 1 wherein said biasing means comprises a coiled spring surrounding said collar body.

4. A quick release collar as defined in claim 2 wherein said grip means comprises an annular ring positioned at one end of said collar body and extending radially outward therefrom.

5. A quick release collar as defined in claim 1 wherein said tapered inner surface has a radially unsupported truncated conical shape.

6. A quick release collar as defined in claim 1 including three radially movable balls equi-angularly spaced about the axis of said passage.

7. A quick release collar as defined in claim 1 wherein said tension ring is secured within said sleeve by press fitting.

8. A quick release collar as defined in claim 1 wherein said collar body and said sleeve are each generally cylindrical in shape.

9. A quick release collar as defined in claim 1 wherein said second flange and said tension ring are positioned adjacent to opposite ends of said sleeve.

10. A quick release collar as defined in claim 1 wherein said tension ring bears against said first flange in the locked position.

11. A quick release collar as defined in claim 1 wherein said inner surface is tapered from a smaller diameter closest to one end of said quick release collar to a larger diameter closest to an opposite end of said quick release collar so that said balls are cammed tightly into contact with an elongated element in said passage when an axial force is applied against the said one end of said quick release collar, and said quick release collar slips relatively freely along said element under the influence of an axial force applied to said collar in a direction toward the opposite end thereof.

12. A quick release collar defined in claim 2 wherein said grip means and said sleeve are sized and arranged to facilitate manual spreading thereof with one hand in order to easily and non-rotatably slide said quick release collar along an elongated element received in said passage.

13. A quick release connector assembly comprising in combination:
   an inner member having a passage extending axially therethrough, a first protrusion on said inner member extending outwardly therefrom in a direction transverse to the axis of said passage, and a plurality of openings in said inner member arranged around and communicating with said passage;

a rigid element axially received in said passage;

a plurality of balls, each ball being movably arranged in one of said openings;

an outer member surrounding said inner member and defining a space therebetween, said outer member having a second protrusion extending inwardly therefrom toward said inner member at a location spaced axially from said first protrusion;

an intermediate member integrally associated with said outer member and located in the space between said inner and outer members, said outer and intermediate members being axially movable as a unit with respect to said inner member between locked and unlocked positions, said intermediate member having an end portion with a tapered inner surface, said tapered inner surface having a relatively small dimensioned segment which urges said balls inwardly into said passage and against said element in the locked position to thereby prevent axial movement of said element relative to said inner member in one direction while permitting said movement in the opposite direction, and having a relatively large dimensioned segment accommodating movement of said balls out of said passage and away from said element in the unlocked position to thereby permit axial movement of said element relative to said inner member in either of said directions, said end portion being spaced radially from both said inner and outer members along substantially the entire length of said tapered inner surface; and biasing means positioned between said first and second protrusions for biasing the combination of said outer and intermediate members axially with respect to said inner member toward the locked position.

14. The quick release connector assembly of claim 13 wherein said inner, outer and intermediate members and said bar each have cylindrical configurations, wherein said first and second protrusions comprise radial flanges, and wherein said tapered inner surface has a truncated conical configuration.

15. The quick release connector assembly of claim 13 wherein said intermediate member and said first protrusion are coactively engageable to limit the extent of movement of said outer and intermediate members toward the locked position.

16. A quick releaser connector assembly comprising:

a collar having a collar body with an axially extending passage extending therethrough, a radially outwardly extending first flange on the outer surface of said collar body, and a plurality of radial openings in said collar body communicating with said passage;

a rigid elongated element axially received in said passage;

radially movable balls located within the openings in said collar body;

a sleeve surrounding said collar body and defining a space therebetween, said sleeve including a second flange extending radially inwardly toward said collar body at a location spaced axially from said first flange;

a tension ring integrally associated with said sleeve body and located in the space between said sleeve and said collar body, said sleeve and said tension ring being axially slidable as a unit with respect to said collar body between a locked position and an unlocked position, said tension ring having an end portion with a tapered inner surface, said tapered inner surface having a relatively small diameter segment which urges said movable balls radially inwardly into said passage and against said element in the locked position to thereby prevent axial movement of said element relative to said collar in one direction while permitting said movement in the opposite direction, and having a relatively large diameter segment accommodating radial movement of said movable balls out of said passage and away from said element in the unlocked position to thereby permit axial movement of said element relative to said collar in either of said directions; means for accomodating radial flexure of said end portion relative to said sleeve along at least the entire length of said tapered inner surface; and biasing means positioned in said space between said first and second flanges for normally biasing said sleeve and said tension ring axially with respect to said collar body toward the locked position.

17. A quick release connector assembly comprising in combination:

(a) a rigid elongated element; and (b) a collar adapted to be removably received on and to be fixed along the length of said element, said collar comprising:

(i) a cylindrical inner body having a passage extending therethrough for receiving said element, a radially outwardly extending first flange on said inner body, and a plurality of radial openings in said inner body communicating with said passage;

(ii) radially movable balls located within the openings in said inner body;

(iii) a sleeve surrounding said inner body and defining a space therebetween, said sleeve including a second flange extending radially inwardly toward said inner body at a location spaced axially from said first flange;

(iv) a tension ring integrally associated with said sleeve and located in the space between said sleeve and said inner body, said sleeve and said tension ring being axially slidable as a unit with respect to said inner body between a locked position and an unlocked position, said tension ring having an end portion with a tapered inner surface, said tapered inner surface having a relatively small diameter segment which urges said movable balls radially inwardly into said passage and against said element in the locked position to thereby prevent axial movement of said element relative to said collar in one direction while permitting said movement in the opposite direction, and having a relatively large diameter segment accommodating radial movement of said movable balls out of said passage and away from said element in the unlocked position to thereby permit axial movement of said element relative to said collar in either of said directions, said end portion being radially unsupported by both said collar and said sleeve along substantially the entire length of said tapered inner surface; and biasing means positioned in said space between said first and second flanges for normally biasing said sleeve and said tension ring axially with respect to said inner body toward the locked position.

18. In a barbell, the combination comprising a bar, at least one weight adapted to fit on said bar, and a quick release collar adapted to be removably fixed on said bar against said weight, said collar comprising:
- a collar body having an axially extending passage extending therethrough for receiving said bar, a radially outwardly extending first flange on the outer surface of said collar body, and a plurality of radial openings in said collar body;
- radially movable balls located within the openings in said collar body;
- a sleeve surrounding said collar body and defining a space therebetween, said sleeve including a second flange extending radially inwardly toward said collar body at a location spaced axially from said first flange;
- a tension ring integrally associated with said sleeve and located in the space between said sleeve and said collar body, said sleeve and said tension ring being axially slidable as a unit with respect to said collar body between a locked position and an unlocked position, said tension ring having a tapered interior surface terminating at an inner end of said sleeve, said tapered interior surface having a relatively small dimensioned portion which urges said movable balls radially inwardly into said passage and against said bar in the locked position, and having a relatively large dimensioned portion accommodating radial movement of said movable balls out of said passage and away from said bar in the unlocked position; and
- biasing means positioned in said space between said first and second flanges for normally biasing said sleeve and said tension ring axially with respect to said collar body toward the locked position, the inner end of said tension ring and said first flange being coactively engageable to limit the extent of movement of said sleeve and said tension ring toward the locked position.

* * * * *